United States Patent [19]

Reinwall et al.

[11] Patent Number: 4,764,069

[45] Date of Patent: Aug. 16, 1988

[54] ANCHOR FOR MASONRY VENEER WALLS

[75] Inventors: Ernest W. Reinwall, McHenry; Robert A. Hagan, Roscoe, both of Ill.

[73] Assignee: Elco Industries, Inc., Rockford, Ill.

[21] Appl. No.: 26,021

[22] Filed: Mar. 16, 1987

[51] Int. Cl.[4] .............................................. C04B 5/00

[52] U.S. Cl. ...................................... 411/397; 52/410; 411/401; 411/435

[58] Field of Search ............... 411/409, 399, 401, 435, 411/427, 185, 186, 187, 188, 189; 175/209, 388, 396; 52/509, 410

[56] References Cited

U.S. PATENT DOCUMENTS

| | | | |
|---|---|---|---|
| 1,289,450 | 12/1918 | Holaday | 411/399 |
| 3,151,512 | 10/1964 | Charczenko | 411/409 |
| 3,523,395 | 8/1970 | Rutter | 411/401 |
| 4,430,035 | 2/1984 | Rodseth | 411/409 |
| 4,653,244 | 3/1987 | Farrell | 411/399 |

FOREIGN PATENT DOCUMENTS

| | | | |
|---|---|---|---|
| 1960453 | 6/1970 | Fed. Rep. of Germany | 411/399 |
| 2856205 | 7/1980 | Fed. Rep. of Germany | 175/388 |

*Primary Examiner*—Henry E. Raduazo
*Attorney, Agent, or Firm*—Leydig, Voit & Mayer

[57] ABSTRACT

The anchor includes a stud holder having one end which threadably receives a threaded stud. A flat tongue-like driving head projects axially from the other end of the stud holder and is formed with an eye for receiving one end portion of a wire tie for establishing a positive lateral load connection between an outer masonry veneer wall and an inner supportive wall having a layer of insulation thereon. An integral, radially extending flange is formed at the inner end of the driving head and stabilizes the stud holder while the latter is being driven by a power-rotated socket. When the stud is fully driven, the flange seals a hole drilled in the insulation by the stud holder. The inner end of the stud holder includes cutting elements which enable the stud holder to drill effectively through both hard and soft insulation. The eye through the driving head is shaped so as to eliminate the need of establishing precise angular alinement between the driving head and the wire tie.

16 Claims, 2 Drawing Sheets

FIG. 1.
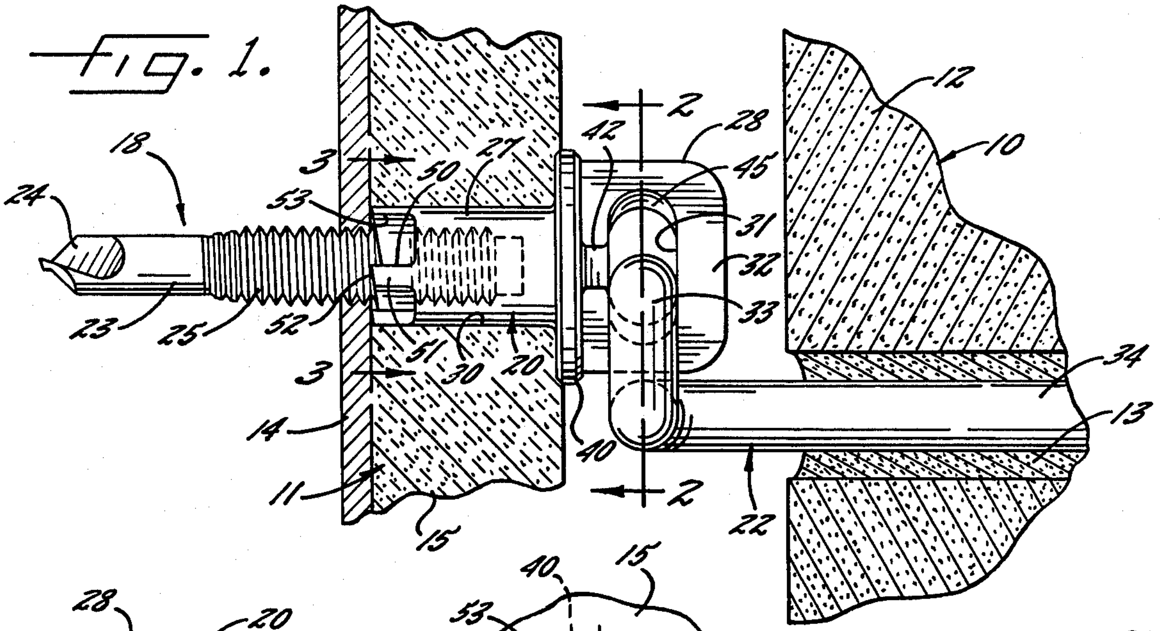
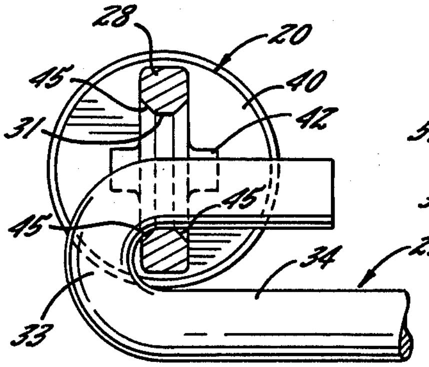
FIG. 2.
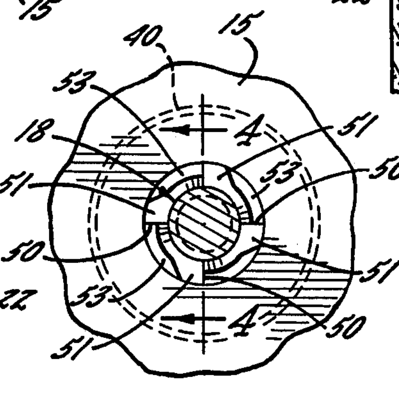
FIG. 3.
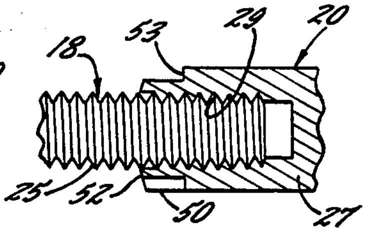
FIG. 4.
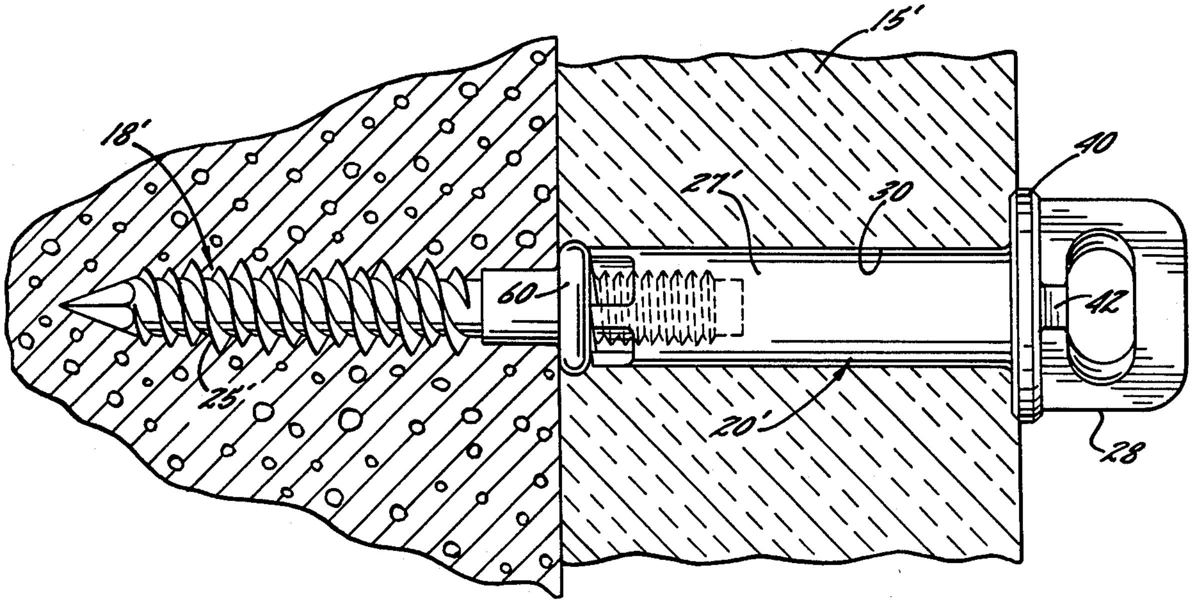
FIG. 5.

ANCHOR FOR MASONRY VENEER WALLS

BACKGROUND OF THE INVENTION

This invention relates generally to a masonry veneer anchor system and, more particularly, to a masonry veneer anchor system of the same general type as disclosed in Lopez U.S. Pat. No. 4,473,984. Such a system is used to establish a positive lateral load connection between an outer masonry veneer wall and an inner structural supportive wall.

In the system disclosed in the Lopez patent, one end portion of a self-drilling, self-tapping stud is screwed into a stud holder formed by a generally cylindrical barrel having an integral, tongue-like driving head on one end thereof. An eye for a wire tie is formed through the driving head while cutting elements are formed on the end of the barrel opposite the head.

The stud is adapted to be driven by a power-rotated socket which is sized and shaped to telescope into driving engagement with the driving head of the stud holder. When the stud is driven, it drills through a layer of insulation on a supportive wall and then drills and taps into the supportive wall itself. During driving of the stud, the cutting elements on the barrel of the stud holder drill a counterbore in the insulation to receive the barrel so as to cause the barrel to seat itself and the stud tightly in the insulation and the supportive wall.

After the stud and the stud holder have been driven, one portion of a wire tie is threaded through the eye of the driving head while another portion of the wire is embedded in the mortar or other cementitious material of a masonry veneer wall disposed alongside the supportive wall. The wire tie provides a positive lateral load connection between the masonry veneer wall and the supportive wall.

SUMMARY OF THE INVENTION

One of the aims of the present invention is to provide a new and improved stud holder of the above general type which may be driven in a more stable manner by a power-rotated driving socket and which, without the use of a separate washer, covers and seals the counterbore in the insulation when the stud and the stud holder are fully driven.

A more detailed object is to achieve the foregoing by forming a radially extending and generally circular flange between the barrel and the driving head of the stud holder. As the stud holder is driven, the flange engages the driving socket to stabilize the holder in the socket and then seats against the insulation to cover and seal the counterbore therein.

Still another object of the invention is to strengthen the driving head through the use of unique gussets between the driving head and the radial flange.

An important object of the invention is to provide a stud holder having new and improved cutting elements which enable the holder to drill cleanly and easily through either soft and compressible insulation or through hard and rigid insulation.

The invention also resides in the unique construction of the eye through the driving head to enable the eye to accommodate angular misalinement between the driving head and the wire tie.

These and other objects and advantages of the invention will become more apparent from the following detailed description when taken in conjunction with the accompanying drawings.

BRIEF DESCRIPTION OF THE DRAWINGS

FIG. 1 is a sectional view taken through a masonry veneer wall and supportive wall having an anchoring system which uses a new and improved stud holder incorporating the unique features of the present invention.

FIGS. 2 and 3 are fragmentary cross-sections taken substantially along the lines 2—2 and 3—3, respectively, of FIG. 1.

FIG. 4 is a fragmentary cross-section taken substantially along the line 4—4 of FIG. 3.

FIG. 5 is a view somewhat similar to FIG. 1 but shows a modified stud and stud holder in conjunction with a different type of supportive wall.

DETAILED DESCRIPTION OF THE PREFERRED EMBODIMENT

Figure 6:
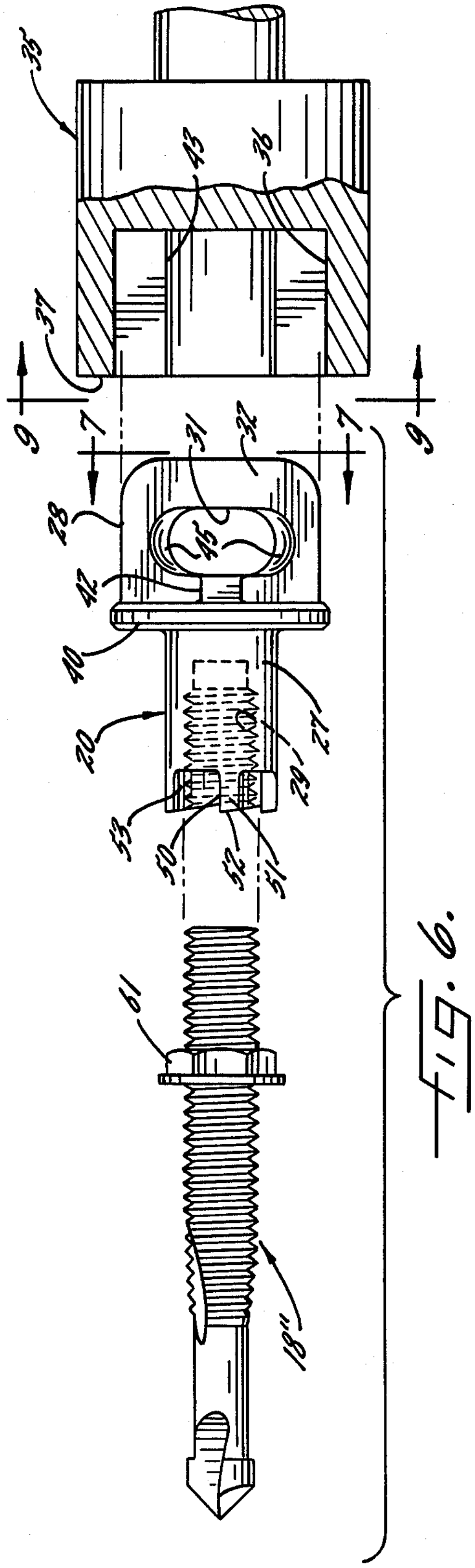
FIG. 6 is a side elevational view showing the stud holder of FIG. 1 in exploded relation with a typical driving socket and with still another type of stud.

For purposes of illustration, the invention is shown in the drawings as embodied in a system for establishing a positive lateral load connection between an outer masonry veneer wall 10 and an inner structural supportive wall 11. In this particular instance, the masonry veneer wall 10 has been shown as being formed by bricks 12 which are joined to one another by mortar 13 or other cementitious material. In FIG. 1, the supportive wall 11 has been shown as being formed by an inner sheet 14 of thin steel and by an outer layer 15 of hard, rigid and fire-resistant insulation such as that sold by Weyerhaeuser under the trademark ULTRABOARD.

The anchoring system comprises three basic components, namely, a threaded stud 18, a stud driver and holder 20, and a wire tie 22. In the embodiment shown in FIGS. 1 to 4, the stud 18 includes an elongated metal shank 23 formed with a self-drilling tip 24 and formed with a self-tapping machine thread 25. When the stud 18 is driven by being rotated and advanced axially, the tip 24 drills through the insulation 15 and the metal sheet 14 and then the thread 25 screws itself into the sheet.

In general, the stud holder 20 includes an elongated cylindrical barrel 27 formed integrally with an outer driving head 28 which, in this instance, is in the form of a flat, axially projecting tongue of generally rectangular shape and generally rectangular cross-section. The stud holder preferably is die cast from a zinc-aluminum alloy.

An axially extending threaded hole 29 (FIG. 4) is formed in the inner end portion of the barrel 27 of the stud holder 20 and is sized to receive the outer end portion of the threaded shank portion 25 of the stud 18. The stud 18 is screwed snugly into the barrel 27 by hand before the stud is driven. During driving of the stud, the barrel 27 drills through the insulation 15 and forms an enlarged counterbore 30 (FIG. 1) which receives the barrel in the finally installed position of the stud.

An eye 31 for receiving a portion of the wire tie 22 is formed transversely through the driving tongue or head 28. As shown in FIG. 1, the eye is generally oblong in shape and is oriented with its long edges extending parallel to and with its short edges extending transversely of the outer free end 32 of the head 28.

In the present instance, the wire tie 21 includes a hooked portion 33 (FIGS. 1 and 2) adapted to loop through the eye 31 of the stud holder 20 and further includes an elongated portion 34 adapted to be embedded in the mortar 13 between adjacent bricks 12. After the stud 18 and the stud holder 20 have been driven, the tie 22 is hooked through the eye 31 and is placed in the wet mortar. When the mortar sets up, the tie forms a positive lateral load connection between the masonry veneer wall 10 and the inner supportive wall 11.

Figure 9:
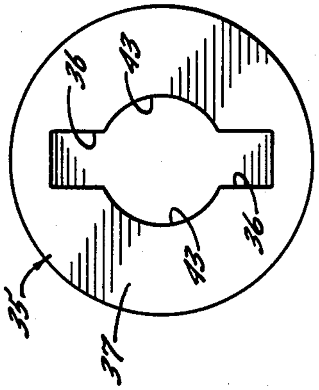
FIG. 9 is an end view of the driving socket as taken along the line 9—9 of FIG. 6.
Figure 8:
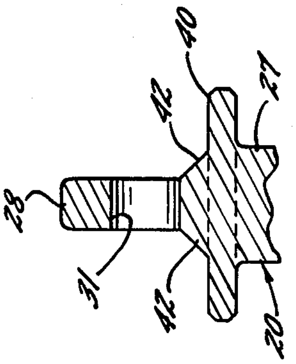
FIG. 8 is a fragmentary cross-section taken substantially along the line 8—8 of FIG. 7.

Driving of the stud 18 and the stud holder 20 is effected by an automatic screw gun (not shown) having a power-rotated driving tool 35 (FIG. 8) formed with a socket 36 which is shaped to couple drivingly with the head 28 of the holder. As shown most clearly in FIG. 9, the socket 36 generally is shaped as an elongated slot formed in the tool 35 and opening out of the flat end face 37 thereof. The cross-sectional size and shape of the slot 36 correspond substantially to the cross-sectional size and shape of the head 28.

In accordance with one aspect of the present invention, an enlarged, radially extending and circular flange 40 is formed as an integral part of the stud holder 20 and is located between the outer end of the barrel 27 and the inner end of the driving head 28. During driving of the stud holder 20, the outer side of the flange 40 squarely engages the flat driving face 37 of the tool 35 and serves to stabilize the stud holder in the socket 36 as the holder is rotated and advanced axially. When the stud 18 is fully driven, the inner face of the flange 40 seats tightly against the outer side of the insulation 15 (see FIG. 1) and thus serves as a washer to close off and seal the counterbore 30 in the insulation. For the flange to effectively close off the counterbore, the diameter of the flange should be significantly greater than the diameter of the barrel 27. In one specific stud holder, the barrel has a diameter of about $\frac{3}{8}$" while the flange has a diameter of about $\frac{3}{4}$".

Advantageously, the flange 40 coacts uniquely with novel means which increase the strength of the head 28 when torque is applied to the head by the driving tool 35 during installation of the stud 18 and the stud holder 20. Herein, these means comprise a pair of gussets 42 (FIGS. 6 to 8) which are formed integrally with opposite sides of the head 28 midway along the length of the inner long edge of the eye 31 and at the junctions of the inner end of the head with the outer end of the flange 40. The gussets are generally triangular in cross-section (see FIG. 8) and serve to reinforce the joint between the head 28 and the flange 40 so as to prevent the head from shearing away from the flange when high torque is applied to the head. The socket 36 of the driving tool 35 is formed with arcuate notches 43 (FIG. 9) which accommodate the gussets 42 when the socket is telescoped into driving relation with the head 28.

The invention also contemplates forming the eye 31 in a unique manner which enables a greater degree of angular freedom between the eye and the hook portion 33 of the wire tie 22. For this purpose, each side of the head 28 is relieved adjacent each of the short edges of the oblong eye 31 so as to form a pocket 45 with a concavely curved bottom (see FIGS. 2 and 6). Each curved pocket 45 blends smoothly into the adjacent short edge of the eye 31 and, if the long dimension of the eye is not perfectly perpendicular to the wire 22 when the holder 20 is fully tightened, the pocket accommodates the variation by allowing angular turning of the wire and thus eliminates the need for orienting the eye at an exact angular position.

Figure 7:
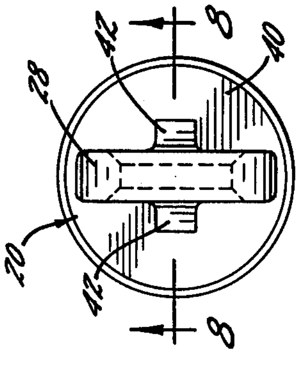
FIG. 7 is an end view of the stud holder as taken along the line 7—7 of FIG. 6.

According to another aspect of the invention, the inner end portion of the barrel 27 of the stud holder 20 is formed with cutting elements 50 (FIGS. 3 and 6) which are uniquely shaped so as to enable the barrel to drill a counterbore 30 effectively through insulation 15 which is both hard and rigid and through insulation 15' (FIG. 5) which is soft and compressible. In this instance, there are four cutting elements 50 in the form of cutting edges which are spaced angularly around and extend axially along the inner end portion of the barrel 27 parallel to the axis thereof. The cutting edges are defined by the outer leading edges of four angularly spaced ribs 51 and lie on a cutting circle having the same diameter as the outer diameter of the barrel 27. The tips 52 of the ribs are inclined at a negative axial rake angle of about 10 degrees as shown in FIGS. 4 and 6.

Formed between the ribs 52 are relieved flutes 53 (FIG. 4) which extend axially along the barrel 27 between the cutting edges 50 of the ribs. The bottoms of the flutes 53 are convexly arcuate and lie along a common circle having a diameter less than the outer diameter of the barrel. The relieved flutes define pockets which store the material of the insulation 15, 15' when the counterbore 30 is drilled through the insulation.

As a result of the axially extending and angularly spaced cutting edges 50, the barrel 27 is capable of drilling through very hard insulation 15 such as ULTRABOARD. In addition, the barrel is capable of drilling a clean counterbore 30 through soft and compressible insulation 15' such as polystyrene without crushing or packing the material into the counterbore. As the soft material is cut away, it is stored in the pockets defined by the flutes 53 and does not interfere with the action of the cutting edges 50 penetrating the material.

The stud holder 20' shown in FIG. 5 is identical to the stud holder 20 of FIGS. 1 to 4, and FIGS. 6 to 8 except that the barrel 27' of the stud holder of FIG. 5 is longer to enable it to penetrate substantially the entire thickness of the relatively thick polystyrene insulation 15'. In FIG. 5, the insulation is shown as attached to a comparatively thick concrete wall 14' and thus the inner end portion of the stud 18' is formed with a masonry thread 25' while the outer end portion of the stud is formed with a machine thread in the same manner as the stud 18. A flange 60 is formed between the two threads of the stud 18' and engages the outer side of the concrete wall and the inner end of the stud holder when the stud is fully tightened.

The stud 18" shown in FIG. 6 is a stud of the type sold by the assignee of the present invention under the trademark DRIL-IT and may be used with the stud holder 20 or 20' interchangeably with the studs 18 or 18'. The stud 18" is particularly designed to drill and tap through thick steel and is formed with an intermediate hexagonal collar 61. The collar may be used to index the blank from which the stud is formed in a proper angular orientation during formation of the drilling tip and also may be enaged and turned by a wrench if it should be necessary to remove the stud from the supportive wall.

From the foregoing, it will be apparent that the present invention brings to the art a new and improved masonry veneer anchor in the form of a stud holder 20 which includes an integral washer or flange 40 for stabilizing the stud holder and the stud 18 in axial alinement with the socket 36 of the driving tool 35 and for sealing the counterbore 30 in the insulation 15. The gussets 42 between the flange and the driving head 28 strengthen the head when torque is applied thereto while the relieved pockets 45 adjacent the eye 31 in the head permit some angular misalinement between the eye and the wire tie 22. The unique configuration of the cutting edges 50 and the adjacent flutes 53 enables the stud holder to effectively drill through both hard and soft material.

We claim:

1. A masonry veneer anchor comprising a generally cylindrical barrel having first and second ends, cutting elements formed integrally with the first end of said barrel and adapted to drill a hole in material when said barrel is driven by being rotated and advanced endwise, an opening formed in the first end of said barrel and extending axially of the barrel, said opening being threaded and being adapted to receive one end portion of a threaded stud, a substantially circular flange formed integrally with and extending radially from the second end of said barrel, the diameter of said flange being significantly greater than the diameter of said barrel, a flat driving tongue formed integrally with and projecting axially from said flange, said tongue being shaped to coact with a rotatable socket for driving the barrel, said flange being engageable with the socket to stabilize the barrel during driving of the barrel and being engageable with the material to seal the hole therein when the barrel is fully driven, said tongue having an eye therethrough for receiving a wire, said eye being generally oblong in shape and being located such that its long edges are inner and outer edges which extend generally parallel to the free end of said tongue while its short edges extend transversely relative to the free end of the tongue, each side of said tongue being relieved adjacent each of the short edges of said eye so as to form a pocket for receiving a portion of the wire.

2. A masonry veneer anchor as defined in claim 1 further including gussets formed integrally with said flange and with opposite sides of said tongue at the junction of said tongue and said flange, said gussets being located midway along the length of the inner long edges of said eye strengthening said tongue during driving of said tongue by said socket.

3. A masonry veneer anchor as defined in claim 2 in which each of said gussets is generally triangular in cross-section.

4. A masonry veneer anchor as defined in claim 1 in which the bottom of each pocket is concavely curved.

5. A masonry veneer anchor as defined in claim 1 in which said cutting elements comprise a series of angularly spaced cutting edges extending axially along the first end portion of said barrel and lying on a cutting circle having a diameter equal to the outer diameter of the barrel, and relieved flutes located between said cutting edges and defining pockets for storing the material cut from said hole.

6. A system for anchoring a masonry veneer wall to a supportive wall by means of a threaded stud adapted to be screwed into the supportive wall by the action of a rotatable driving socket and by means of a stud holder for anchoring a first part of a wire tie having a second part adapted for embedment in cementitious material of the veneer wall, said system being characterized in that said stud holder comprises a generally cylindrical barrel die cast from metal and having first and second ends, cutting elements formed integrally with the first end of said barrel and shaped to drill a hole in said supportive wall when said barrel is driven by being rotated and advanced endwise by said socket, said cutting elements comprising a series of angularly spaced and substantially straight cutting edges extending axially along the first end portion of said barrel and lying on a cutting circle having a diameter equal to the outer diameter of the barrel, and relieved and substantially straight axially extending flutes located between said cutting edges and defining pockets for storing the material cut from said supportive wall, an opening formed in the first end of said barrel and extending axially of the barrel, said opening being threaded and being sized to threadably receive one end portion of said stud to couple said stud and said stud holder in assembled relation, a flange formed integrally with and extending radially from the second end of said barrel, said flange being circular in shape and having a diameter significantly greater than the diameter of said barrel, and a flat driving tongue formed integrally with and projecting axially from said flange and having an eye formed therethrough for receiving the first part of said wire tie, said tongue being shaped to telescope into said driving socket in non-rotatable relation therewith, said flange being engageable with the end of the socket during driving of the barrel by the socket and being engageable with said supportive wall to seal the hole therein when the barrel is fully driven.

7. A system as defined in claim 6 further including gussets formed integrally with said flange and with opposite sides of said tongue at the junction of said tongue and said flange, said gussets strengthening said tongue during driving of said tongue by said socket.

8. A system as defined in claim 6 in which said eye is generally oblong in shape and is located such that its long edges extend generally parallel to the free end of said tongue while its short edges extend transversely relative to the free end of the tongue, each side of said tongue being relieved adjacent each of the short edges of said eye so as to form a pocket for receiving a portion of the first part of the wire tie.

9. A system as defined in claim 6 in which the bottoms of said flutes are arcuate and lie on a circle having a diameter less than the outer diameter of said barrel.

10. A system as defined in claim 9 in which there are four of said cutting edges spaced equally from one another around said barrel.

11. A masonry veneer anchor comprising a generally cylindrical barrel die cast from metal, a flat driving tongue joined integrally to and projecting axially from one end of the barrel, said tongue having an eye formed therethrough for receiving a wire, an opening formed in the other end of the barrel and extending axially of the barrel, said opening being threaded and being adapted to receive one end of a threaded stud, and cutting elements formed integrally with said other end of said barrel and adapted to drill a hole in material when said barrel is rotated and advanced axially, said cutting elements comprising a series of angularly spaced and substantially straight cutting edges extending axially along said barrel and lying on a cutting circle having a diameter equal to the outer diameter of the barrel, and relieved and substantially straight flutes extending axially along said barrel between said cutting edges and defining pockets for storing material cut from said hole by said cutting edges.

12. A masonry veneer anchor as defined in claim 11 in which the bottoms of said flutes are arcuate and lie on a common circle having a diameter less than the outer diameter of said barrel.

13. A masonry veneer anchor as defined in claim 12 in which there are four of said cutting edges spaced equally from one another around said barrel.

14. A masonry veneer anchor as defined in claim 11 further including a radially extending and generally circular flange formed integrally with said barrel between said tongue and said one end of said barrel, said flange having a diameter substantially greater than the diameter of said barrel.

* * * * *